(12) United States Patent
Steinbrecher

(10) Patent No.: US 7,623,002 B2
(45) Date of Patent: Nov. 24, 2009

(54) METHOD FOR COUPLING A DIRECT CURRENT POWER SOURCE ACROSS A NEARLY FRICTIONLESS HIGH-SPEED ROTATION BOUNDARY

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 185 days.

(21) Appl. No.: 12/022,537

(22) Filed: Jan. 30, 2008

(65) Prior Publication Data

US 2009/0190374 A1 Jul. 30, 2009

(51) Int. Cl.
*H01P 5/00* (2006.01)
(52) U.S. Cl. ..................... 333/24 C; 333/260
(58) Field of Classification Search ............... 333/24 C, 333/24 R, 172, 177, 181; 363/15–20, 25, 363/60–64; 310/166, 232, 235, 268; 318/660–661
See application file for complete search history.

(56) References Cited

U.S. PATENT DOCUMENTS

| | | | | |
|---|---|---|---|---|
| 4,414,496 A | * | 11/1983 | Watanabe et al. | 318/696 |
| 4,857,926 A | * | 8/1989 | Neglia et al. | 341/116 |
| 5,018,174 A | * | 5/1991 | Collins | 378/4 |
| 5,173,696 A | * | 12/1992 | Howard et al. | 341/117 |
| 6,331,759 B1 | * | 12/2001 | Atmur | 318/661 |

\* cited by examiner

*Primary Examiner*—Rajnikant B Patel
(74) *Attorney, Agent, or Firm*—James M. Kasischke; Michael P. Stanley; Jean-Paul A. Nasser

(57) ABSTRACT

A system and method is provided for coupling a power source across a rotation boundary. A generator converts a DC source on the stationary side of a rotation boundary to a square-wave at a determined frequency. The generator output connects through a transmission line and a first transformer to a set of stator rings. A set of rotor rings form a set of coupling capacitors with the stator rings. The rotor rings connect through a second transformer and a transmission line to a non-linear circuit capable of converting the square-wave to a DC voltage and current that can power a load on the rotating side of the rotating boundary in which the power is nearly equal to the power available from the source on the stationary side of the rotation boundary.

20 Claims, 14 Drawing Sheets

METHOD FOR COUPLING A DIRECT CURRENT POWER SOURCE ACROSS A NEARLY FRICTIONLESS HIGH-SPEED ROTATION BOUNDARY

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to power transmission and more specifically to a method for coupling a direct current across a high-speed rotation boundary.

(2) Description of the Prior Art

Sensor systems located at the end of towed tethers require Direct Current (DC) power for operation. Rotary joints are positioned along a tether to prevent twisting and breakage of the tether. A problem arises in connection with electronic circuits for sensing or control that are placed on a rotating platform.

As such, an ongoing need exists to permit DC power to be transmitted across rotary joints and to permit signals to be sent to a tethered sensor system and data to be retrieved from the sensor system.

A number of commercial applications may also exist. For example, an application may be transferring power to sensors in the rotating wheels of vehicles using a long-life frictionless connection.

SUMMARY OF THE INVENTION

It is, therefore, a general purpose and primary object of the present invention to provide a method for coupling a direct current power source across a rotating boundary.

It is a further object of the present invention to provide a method for coupling a DC power source across a nearly frictionless and high speed rotating boundary.

To attain the objects described, a method is disclosed for coupling DC power across a rotating boundary, in which the boundary may be operating at a high speed of rotation. The method incorporates balanced concentric cylinders separated by a dielectric medium that form capacitor couplings. However, anyone skilled in the art will recognize that the method can also be realized by a dual method wherein a magnetic coupling mechanism is effected by placing coupled coils on topologically opposite sides of a non-magnetic rotating boundary. While this application will focus on capacitive coupling in order to teach the method, the dual magnetically coupled mode is claimed implicitly. The dielectric medium can be a vacuum, a gas, or a non-conducting liquid.

If the dielectric medium is a vacuum or a gas, then the method would be nearly frictionless and no presently measurable mechanical or electrical friction losses would result. A liquid dielectric, which would introduce more friction, may allow application of the method in cases involving rotary joints that penetrate a sealed environment.

The disclosed method also permits external control of a DC field current without the need for brushes or wiper contacts. Brushes and wiper contacts introduce friction, which is a potential for intermittent contact. Contact also requires regular maintenance of the equipment impacted. Many rotating field alternators are in use today in power generation systems.

BRIEF DESCRIPTION OF THE DRAWINGS

Other objects, features and advantages of the present invention will become apparent upon reference to the following description of the preferred embodiments and to the drawings wherein.

DETAILED DESCRIPTION OF THE INVENTION

Figure 1:
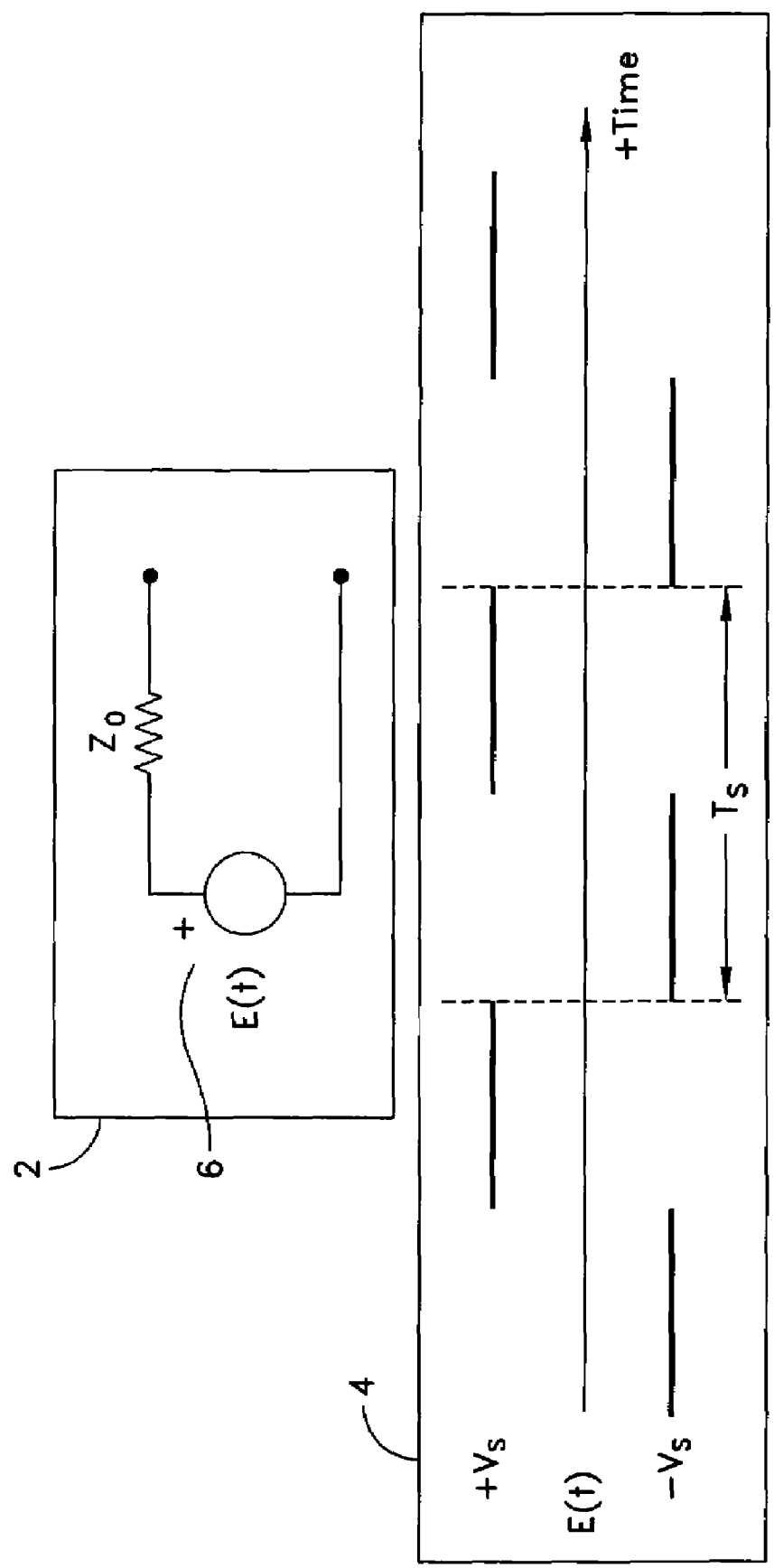
FIG. 1 depicts a Thevenin-Equivalent square-wave source.

Generally, the disclosure describes a method for transmitting DC power over a uniform transmission line of any length using two circuits that work together to provide the power to loads that are remotely located with respect to the sources of the power.

The first circuit, a square-wave generator, uses a DC source to generate a square-wave. The generator uses an inductor, a capacitor, and a switch, which may be implemented using a single transistor and a drive circuit. The second circuit, a square-wave converter, converts a square-wave source into a DC source. The converter uses an inductor, a capacitor, and a P-N junction diode.

The square-wave generator and square-wave converter each provide a matched termination to a uniform transmission line so that energy is not reflected from the converter back toward the generator. Thus, the transmission line can be many wavelengths long without affecting the efficiency of power transmission. Typically, power is lost and a voltage drop occurs as a result of transmission line Ohmic losses. Using transmission line transformers to increase voltage and to decrease current on the transmission line can reduce these Ohmic losses.

The transmission efficiency of the disclosed method is determined by departures from an ideal of the parameters of the components used. If the switch, diode, inductors, capacitors, and transmission line were all ideal and lossless, then the transmission efficiency would be one hundred percent.

A small amount of DC power is required to energize the disclosed switch driver circuits; however, the switch driver is located at the DC source where, presumably, DC power is plentiful. Therefore, the issue of switch driver power is minimized when discussing the transmission efficiency of the disclosed method. That is the DC power delivered to the load would be equal to the DC power available from the source.

In practice, system considerations and the non-ideal nature of the components affect the actual efficiency of the method. However, for the purposes of this disclosure, the components are assumed to be ideal and, therefore, the predicted DC transmission efficiency is approximately one hundred percent.

There is also a limitation on the amount of power that can be delivered to a load using the disclosed method. The limitation is fixed by the non-linear properties of the diode used in the converter circuit. The maximum current that can be delivered to a load is one-half of the maximum forward current that the diode can safely carry. The maximum voltage that can be delivered to a load is one-half of the breakdown voltage of the diode. The maximum DC power that can be delivered to a load is the product of one-half of the maximum forward current and one-half of the breakdown voltage. For example, a diode with a reverse breakdown voltage of one hundred Volts may be able to support a maximum forward current of one ampere. Then, the maximum power that could be delivered to a resistive load by a converter that uses the diode would be 25 Watts (50 Volts×500 mA).

The disclosed method uses inductors and capacitors for energy storage. It is known in the art that energy is lost when an abrupt change in capacitor voltage or an abrupt change in inductor current is required by circuit operation. Within the disclosed method and under steady-state operating conditions, inductor current and capacitor voltage remain essentially constant.

A "steady-state" operating condition is an operating condition under which the circuits would normally be used. When the circuits used in the method are energized and the switch begins operation, the current through the inductors and the voltage across the capacitors are both zero. A transient state exists until the inductor currents and capacitor voltages have become periodically stable. At this time of stability, the operating conditions are described as "steady-state". However, the inductor voltage and the capacitor current are each subjected to abrupt changes as the square-wave polarity changes. Even though these changes are allowable with ideal components, the parasitic capacitance of the inductors and the parasitic inductance of the capacitors will degrade the ideal operation of the method and decrease the observed efficiency. These parasitic effects are not addressed in this disclosure because, in good engineering practice, these effects only minimally degrade performance.

Introduction to the Disclosed Method

In FIG. 1, a Thevenin-Equivalent square-wave source 2 is shown. In the figure, voltage 4 of a signal generator 6 switches between a positive-value state, $+V_S$, and a negative-value state, $-V_S$, in which the states have the same magnitude but opposite polarity. The switching operation is periodic with a period, $T_S$, and with equal dwell times in each state. Thus, the average value of the voltage 4 is zero. Furthermore, the time required to switch between the two states is negligible and is assumed to be zero.

The characteristic impedance of the generator 6 is $Z_0$, a positive real number. In general, a Thevenin-Equivalent source impedance can be complex and may, under certain circumstances, have a negative real part. However, for the purpose of this disclosure, only positive real values of $Z_0$ are considered. This restriction is consistent with practical applications of the disclosed method.

If an equivalent circuit were used to drive a transmission line with a characteristic impedance also equal to $Z_0$, then the equivalent circuit for the output of the transmission line would be identical to the illustration in FIG. 1, regardless of the length of the transmission line.

Figure 2:
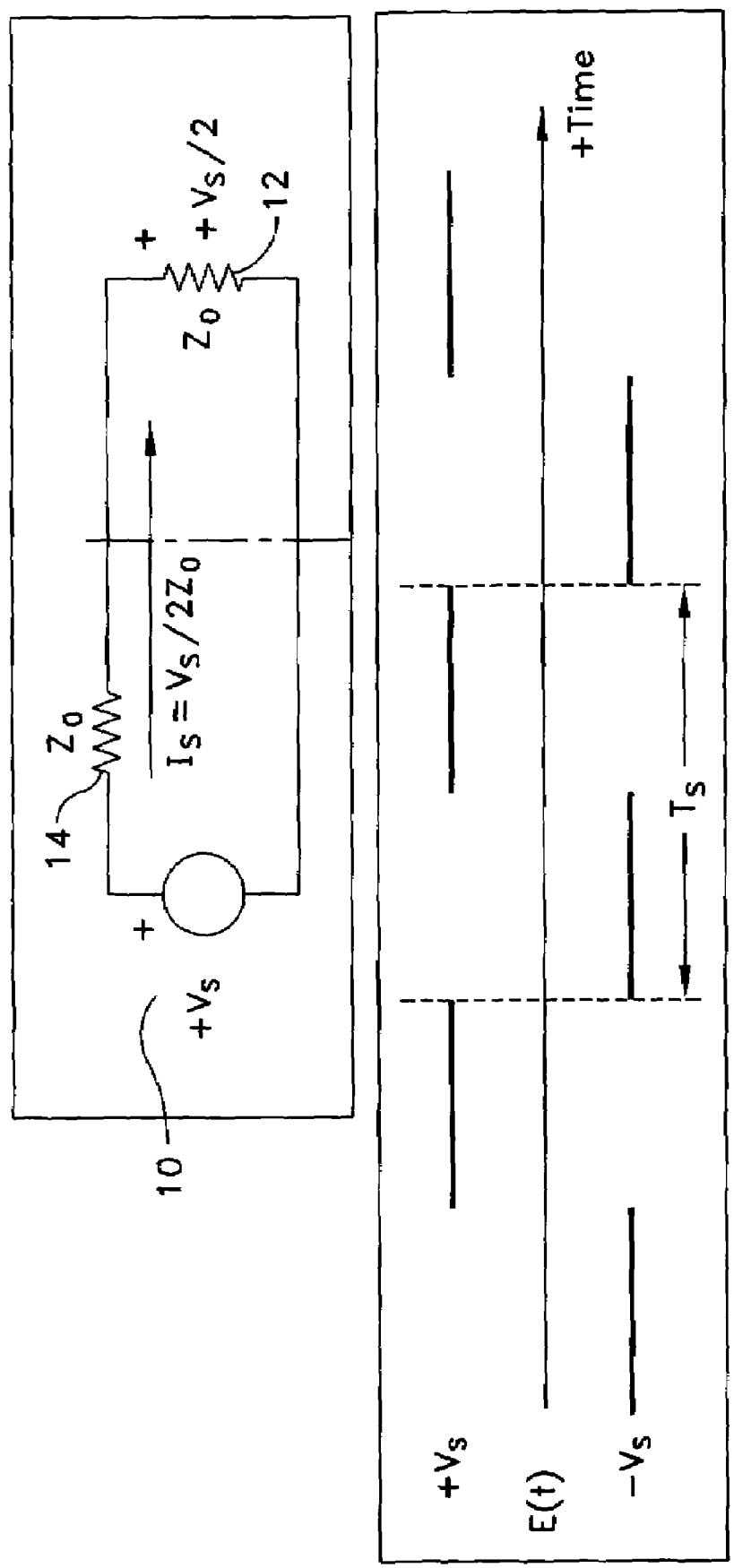
FIG. 2 depicts a loaded square-wave source.

The maximum power available from the Thevenin-Equivalent circuit of FIG. 1 is equal to the power that would be delivered to a load resistor equal to $Z_0$, as illustrated in FIG. 2. In the figure, maximum power transfer occurs when a generator 10 is driving a load 12. The load 12 is $Z_0$, which is equal to impedance 14 of the generator 10. Under these conditions, the voltage across the load 12 is one-half the voltage of the generator 10 and the current is one-half of the short-circuit current available from the Thevinin-Equivalent generator.

Figure 3:
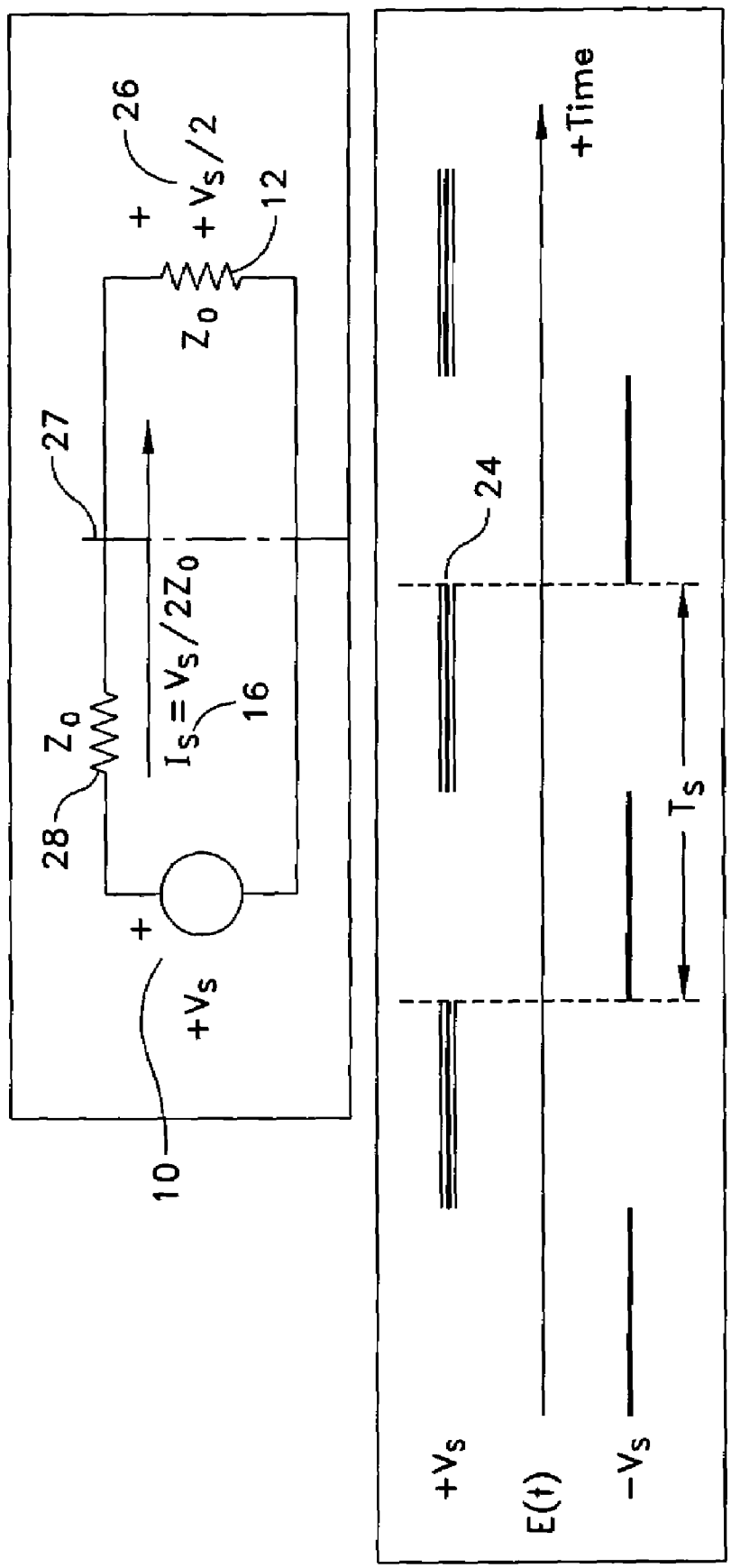
FIG. 3 depicts a square-wave source, positive half period.

During the positive state of the generator 10, illustrated in FIG. 3, a current 16 passing through the load (12), $Z_0$, is $V_S/2Z_0$ so that the instantaneous power delivered to the load is $V_S^2/4Z_0$. During a positive half period 24 of the square-wave cycle, the current 16 is positive and equal to the peak voltage, $V_S$, divided by the total circuit resistance $2Z_0$, and a voltage 26 across the load 12 is just one half the peak voltage $V_S$.

Figure 4:
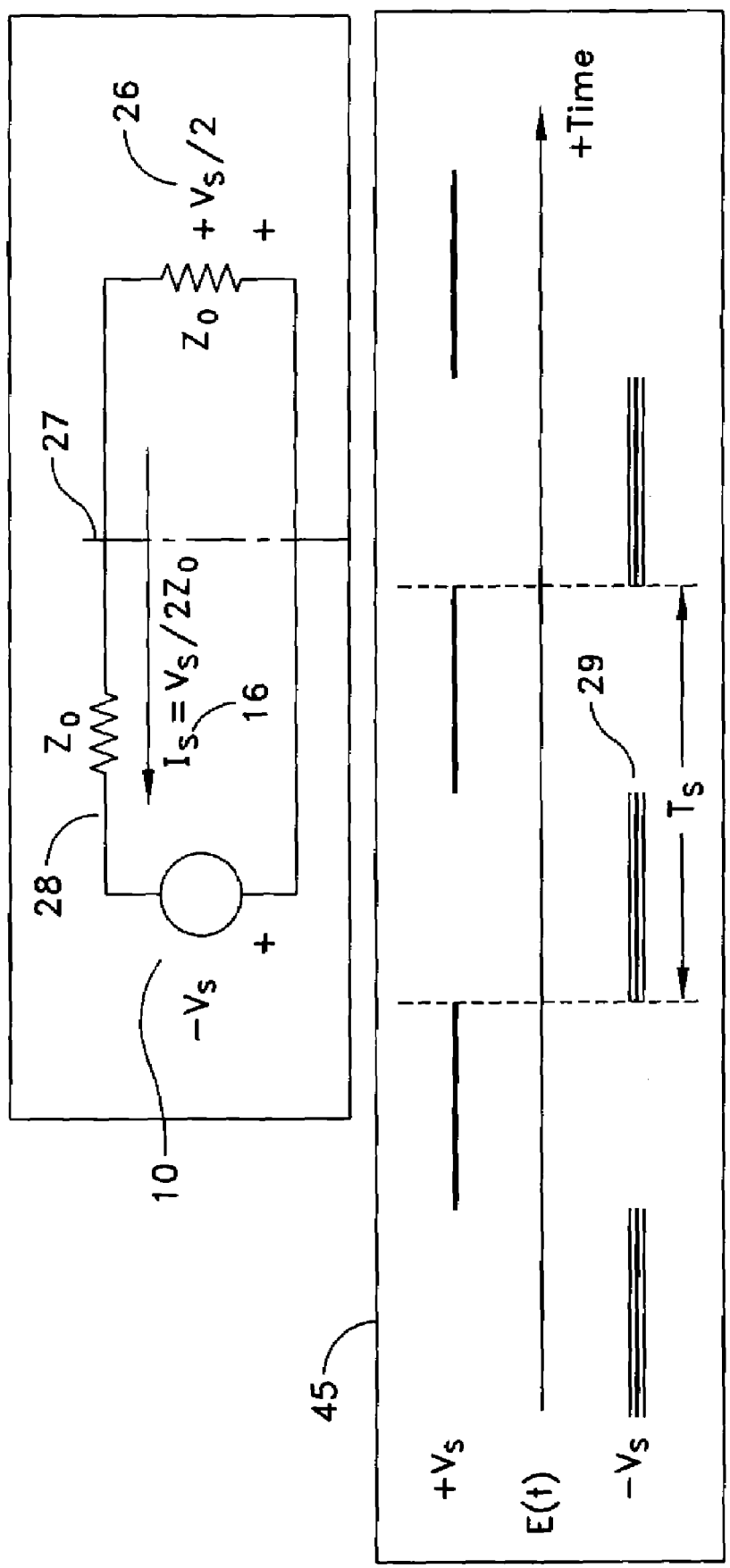
FIG. 4 depicts a square-wave source, negative half period.

During a negative state, illustrated in FIG. 4, the instantaneous power delivered to the load, $Z_0$, is the same, $(V_S)^2/4Z_0$, even though the current 16 flows in the opposite direction. During a negative half period 29 of the square-wave cycle, the current 16 is positive and is equal to the peak voltage, $V_S$, divided by the total circuit resistance $2Z_0$ and a voltage across the load is one-half of the peak voltage, $V_S$.

The average power is equal to the instantaneous power and is defined as $P_{MAX}=(V_S)^2/4Z_0$, which is the maximum power available from the source. Thus terminated, the generator is optimally loaded because the generator is delivering maximum available power to the load, $Z_0$.

Energy-Efficient Square-Wave Generator

Figure 5:
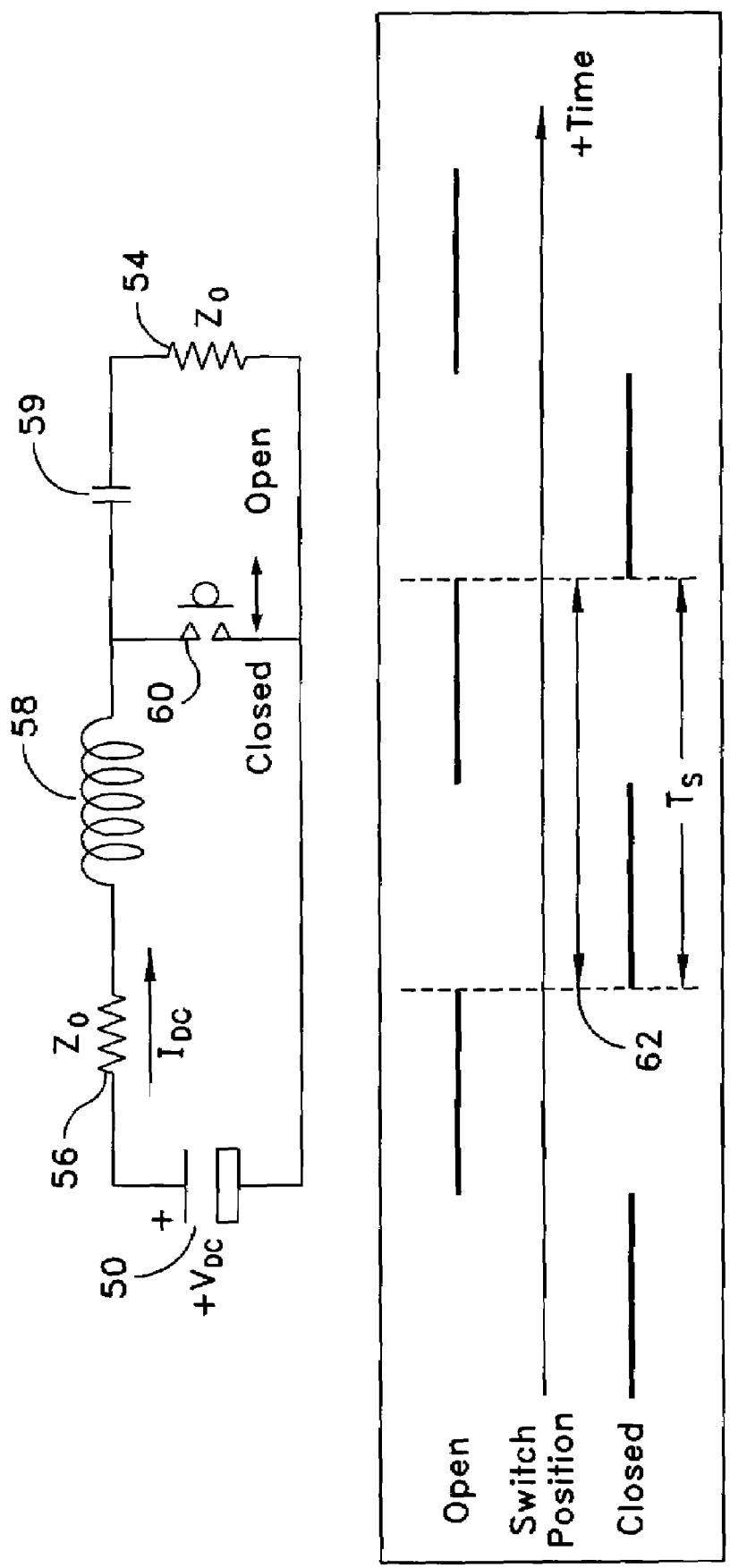
FIG. 5 depicts an energy efficient square-wave generator.

The circuit illustrated in FIG. 5 can be used to convert a DC source 50 into a square-wave driving an impedance of a load resistor 54 which is equal to an internal impedance 56 of the DC source. Assuming ideal components, an inductor 58 and a capacitor 59, the efficiency of the conversion is one hundred percent because the average square-wave power delivered to the impedance of the load resistor 54 is equal to the maximum DC power available from the DC source 50. A square-wave is created by the periodic operation of a switch 60 that changes state once each period (62) $T_S$, of the square-wave. The two states of the switch 60 are defined as follows: (1) when the switch is OPEN, the current through the branch containing the switch is identical to zero while the voltage across the branch may assume any value, and (2) when the switch is CLOSED, the voltage across the branch containing the switch is identical to zero while the current through the branch may assume any value. The dwell time in each of the two switch states is the same.

In FIG. 5, the switch 60 opens and closes periodically causing a square-wave of current to pass through the load resistor, $Z_0$ (54). A transient state occurs when the action of the switch 60 is initialized. The transient state lasts until the voltage across the capacitor 59 and the current through the inductor 58 each reach a steady-state condition.

Figure 6:
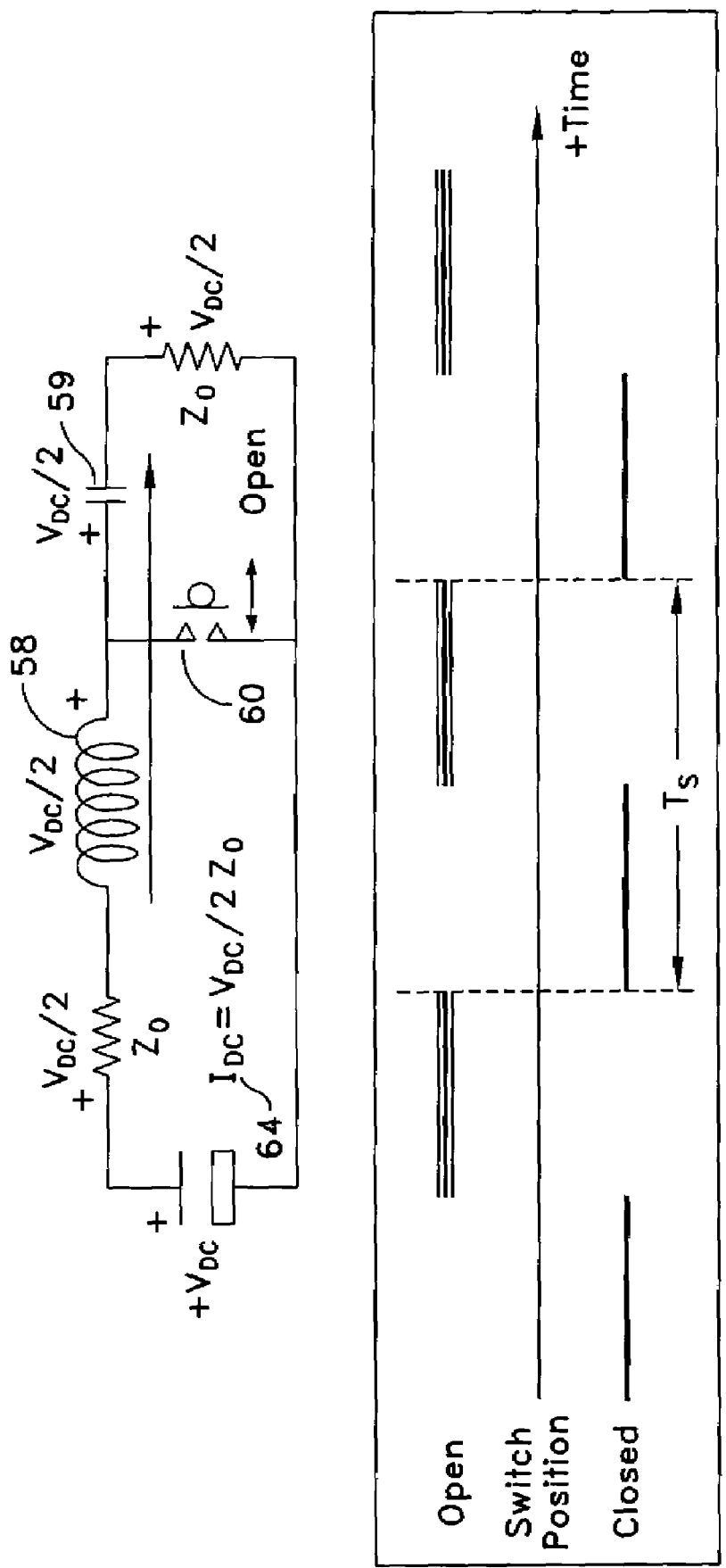
FIG. 6 depicts a square-wave generator, steady-state, OPEN switch.

A steady-state OPEN condition of the switch 60 is illustrated in FIG. 6. During this half period, $T_S/2$, energy is delivered to the circuit by the inductor 58 while a stored energy of the capacitor 59 is increasing. The average, steady-state, energy stored on the inductor 58 is $E_{AVG}=\{L(V_{DC})^2\}/8(Z_0)^2$ in which "L" is the inductance of the inductor.

The energy delivered to the circuit by the inductor 58 during each OPEN condition half period is $E_{DEL}=T_S(V_{DC})^2/8Z_0$. The choice of value of the inductor 58 is made by observing that the exchanged or delivered energy, $E_{DEL}$ should be a fraction of the average energy, $E_{AVG}$. This will be true if the inductance is much greater than the product, $Z_0T_S$. Thus, $L>>Z_0T_S$ is required. During the OPEN condition, the voltage across the branch of the switch 60 is $V_{DC}$.

During this half period, the switch 60 is OPEN so that the current through the branch of the switch is zero. A steady-state current 64 equal to $V_{DC}/2Z_0$ passes through the load, $Z_0$, producing a voltage, $V_{DC}/2$. During this half period, energy is supplied to the circuit by the inductor 58 while energy is being stored in the capacitor 59. The voltage across the open switch 60 is $V_{DC}$.

Figure 7:
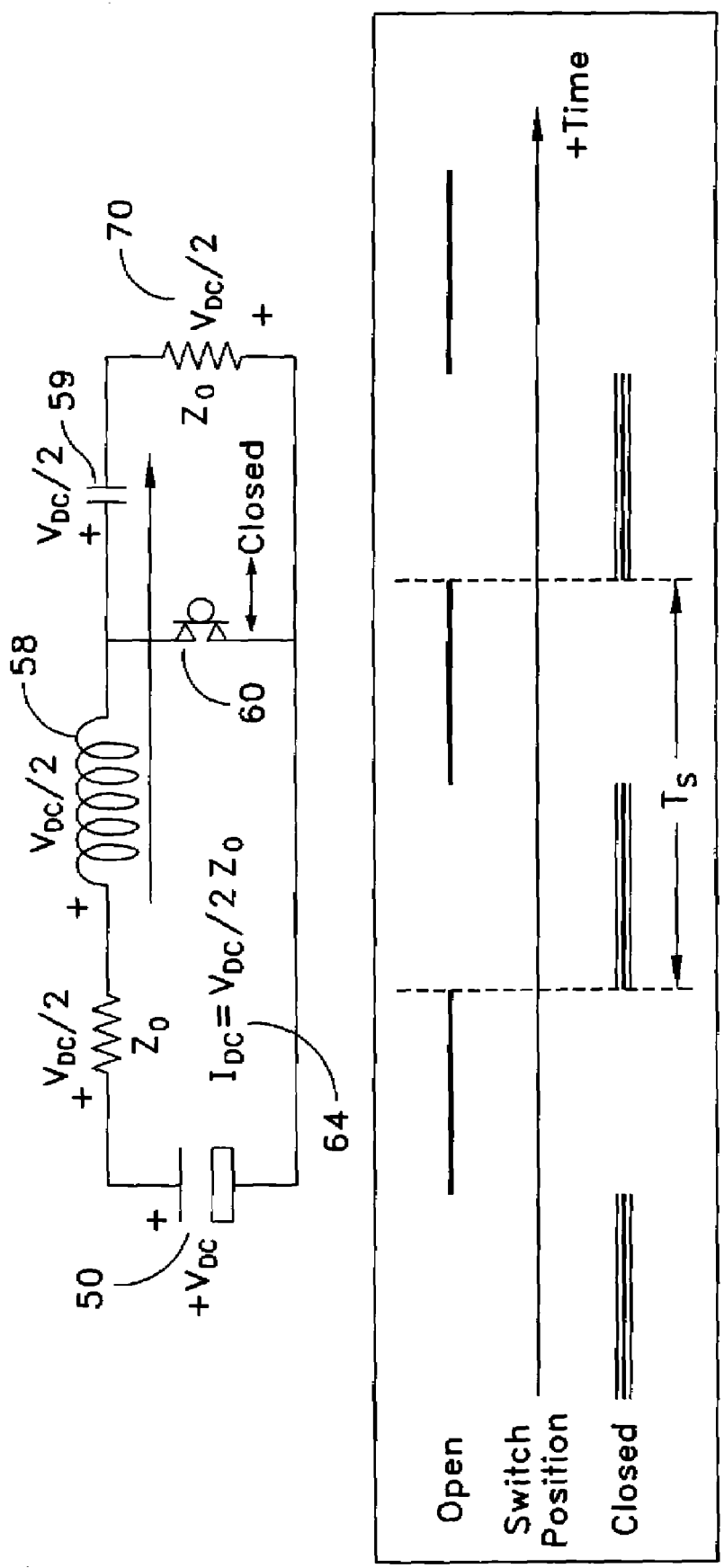
FIG. 7 depicts a square-wave generator, steady-state, CLOSED switch.

A steady-state switch CLOSED condition is illustrated in FIG. 7. During this half period, the switch 60 is CLOSED so that the voltage across the switch branch is zero. The steady-state current 64 reverses through the load, $Z_0$, producing a voltage, $-V_{DC}/2$. During this half period, energy is supplied to the circuit by the capacitor 59 while energy is being stored in the inductor 58. The current through the CLOSED switch 60 is $V_{DC}/Z_0$ which is twice the steady-state DC current supplied by the DC source 50.

During this half period, $T_S/2$, energy is delivered to the circuit by the capacitor 59 while stored energy of the inductor 58 increases. The average, steady-state, energy stored on the capacitor 59 is $E_{AVG}=C(V_{DC})^2/8$ in which "C" is the capacitance of the capacitor. The energy delivered to the circuit by the capacitor 59 during each CLOSED condition half period is $E_{DEL}=T_S(V_{DC})^2/8Z_0$, which is the same as that delivered by the inductor 58 during each OPEN condition half period.

The choice of value of the capacitor 59 is made by observing that the delivered energy, $E_{DEL}$, should be a fraction of the average energy, $E_{AVG}$. This will be true if the capacitance is much greater than the ratio $T_S/Z_0$. Thus, $C>>T_S/Z_0$ is required. During the CLOSED condition of the switch 60, the current through the switch is $V_{DC}/Z_0$, which is twice the current through the DC source 50.

Energy balance is achieved if the ratio of the element values, L and C, are chosen such that $(L/C)=(Z_0)^2$. Then, the average energy stored on each element is the same. The energy exchange during each period of steady-state operation is illustrated in FIG. 8.

Figure 8:
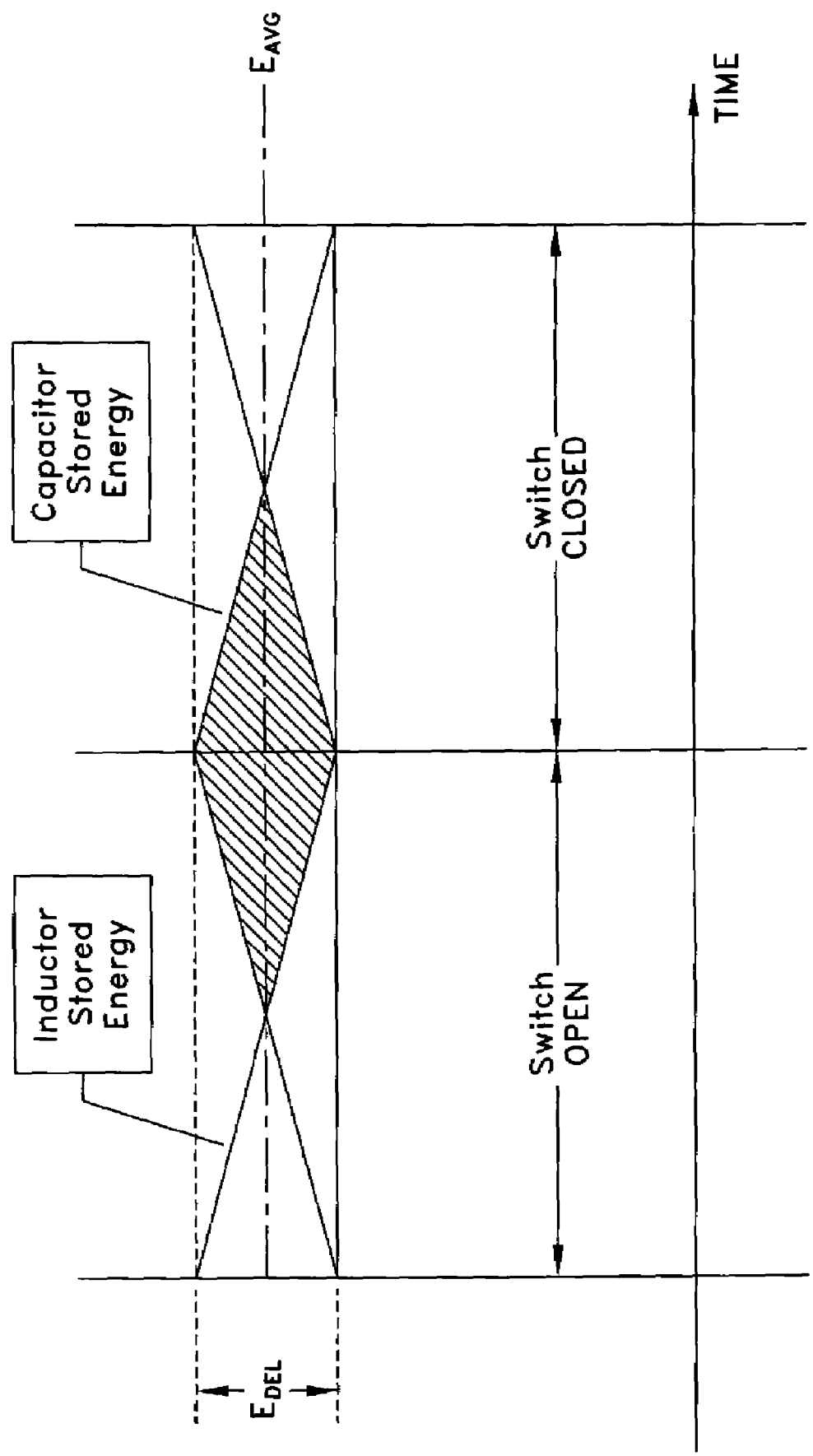
FIG. 8 depicts a square-wave generator, steady-state energy exchange.

In FIG. 8, the figure depicts the time variation of the energy stored on the inductor and capacitor components in the square-wave generator illustrated in FIG. 5, FIG. 6, and FIG. 7. During each half period, energy is delivered to the circuit by either the inductor or the capacitor while the energy on the other component is increasing. During the next half period, the process reverses. The graph is based on an assumed condition that $E_{DEL}<<E_{AVG}$. Only one period is illustrated because, in the steady-state condition, each period is identical to every other period.

By comparing FIG. 6 with FIG. 7, the effects caused by the CLOSING operation of the switch 60 are seen. The instant that the switch 60 closes, the voltage across the inductor 58 changes polarity, but not magnitude, while the current through the capacitor 59 and a load impedance 70 changes direction, but not magnitude. Both of these instantaneous changes are permissible by the boundary conditions imposed by the circuit components and no transient behavior occurs as a result of the CLOSING operation of the switch 60. The current through the inductor 58 and the voltage across the capacitor 59 do not change when the switch 60 CLOSES and this is also required by the respective boundary conditions.

In one embodiment, the switch 60 used to implement this square-wave generator circuit would be a transistor collector-emitter circuit. A small amount of energy would be necessary to power a switch driver to provide the base-emitter drive current, which may be more than one hundred times less than the peak collector-emitter current, $V_{DC}/Z_0$, when the switch 60 is CLOSED.

Energy Efficient [Square-Wave]-to-DC Converter

Figure 9:
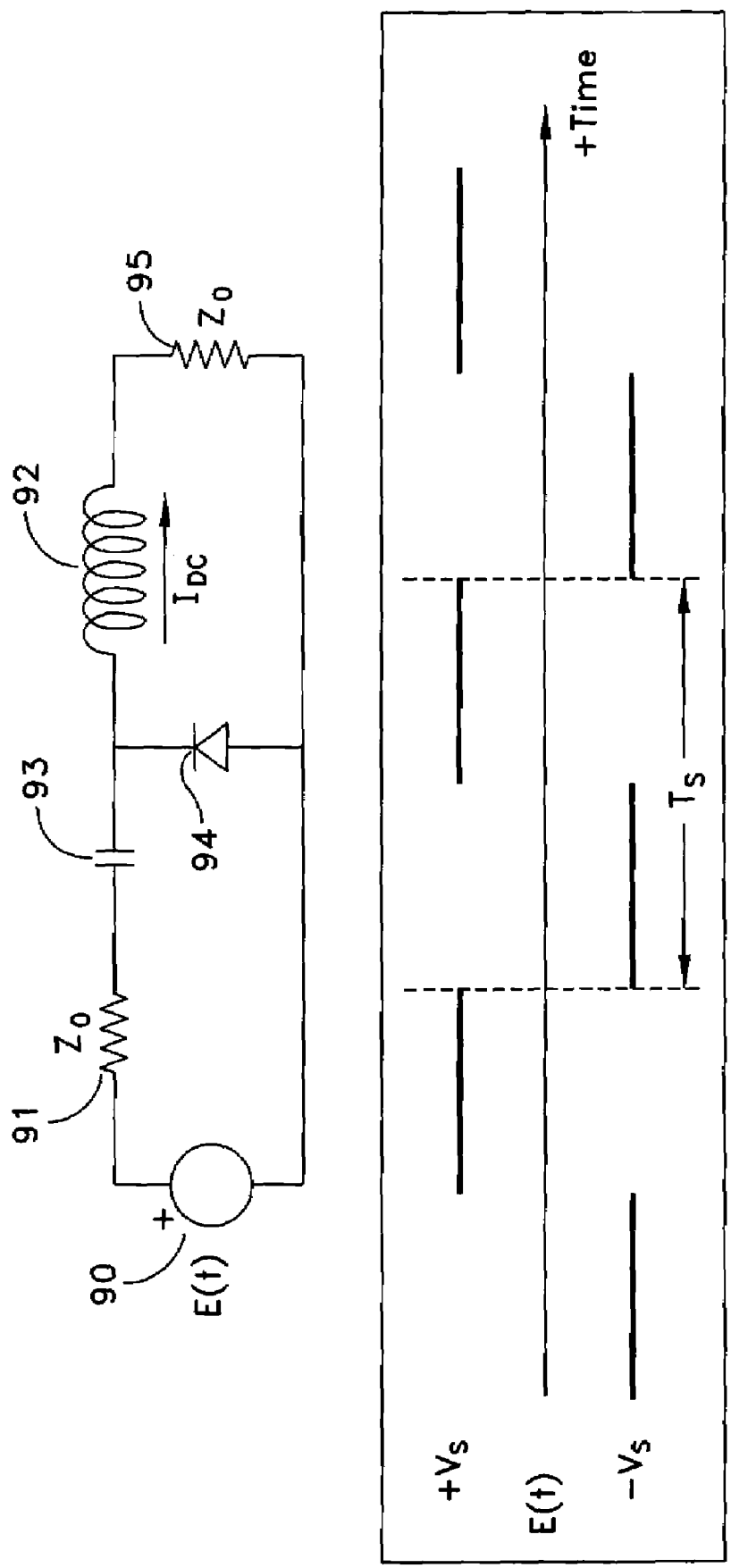
FIG. 9 depicts an energy efficient [square-wave]-to-DC converter circuit.

In FIG. 9, a [square-wave]-to-DC converter circuit is shown. The passive circuit requires a capacitor and an inductor for energy exchange and a single diode. A square-wave source 90 and a source impedance 91 represent the Thevenin-Equivalent, as previously described in the "Introduction to the Disclosed Method" section, of a transmission line being driven by a square-wave generator, as previously described in the "Energy-Efficient Square-Wave Generator" section. If an inductor 92, a capacitor 93, and a diode 94 of the converter circuit are assumed to be ideal, then the efficiency of the converter circuit is one hundred percent. That is, the DC power delivered to a load resistor 95 is equal to the maximum power available from the Thevenin-Equivalent generator.

The square-wave is converted to DC power by a non-linear property of the diode 94 that, in one state, permits an undefined current to flow through the diode in only one direction while the voltage across the branch containing the diode is zero and that, in a second state, permits an undefined voltage across the branch for the diode in only one polarity while the current through the branch for the diode is zero. The operation of the converter circuit in steady-state can best be described by observing each non-linear state separately. When the diode polarity is as illustrated in FIG. 9, the two states correspond to the NEGATIVE half period of the square-wave and to the POSITIVE half period of the square-wave, respectively.

The square-wave source 90 switches periodically between a positive voltage, $+V_S$, and a negative voltage, $-V_S$. After a steady-state condition is reached, the inductor 92 acts as a constant current source delivering a positive current to the load resistor 95. A transient state occurs when the square-wave source is first initialized. A transient state lasts until the voltage across the capacitor 93 and the current through the inductor 92 each reach a steady-state condition.

Figure 10:
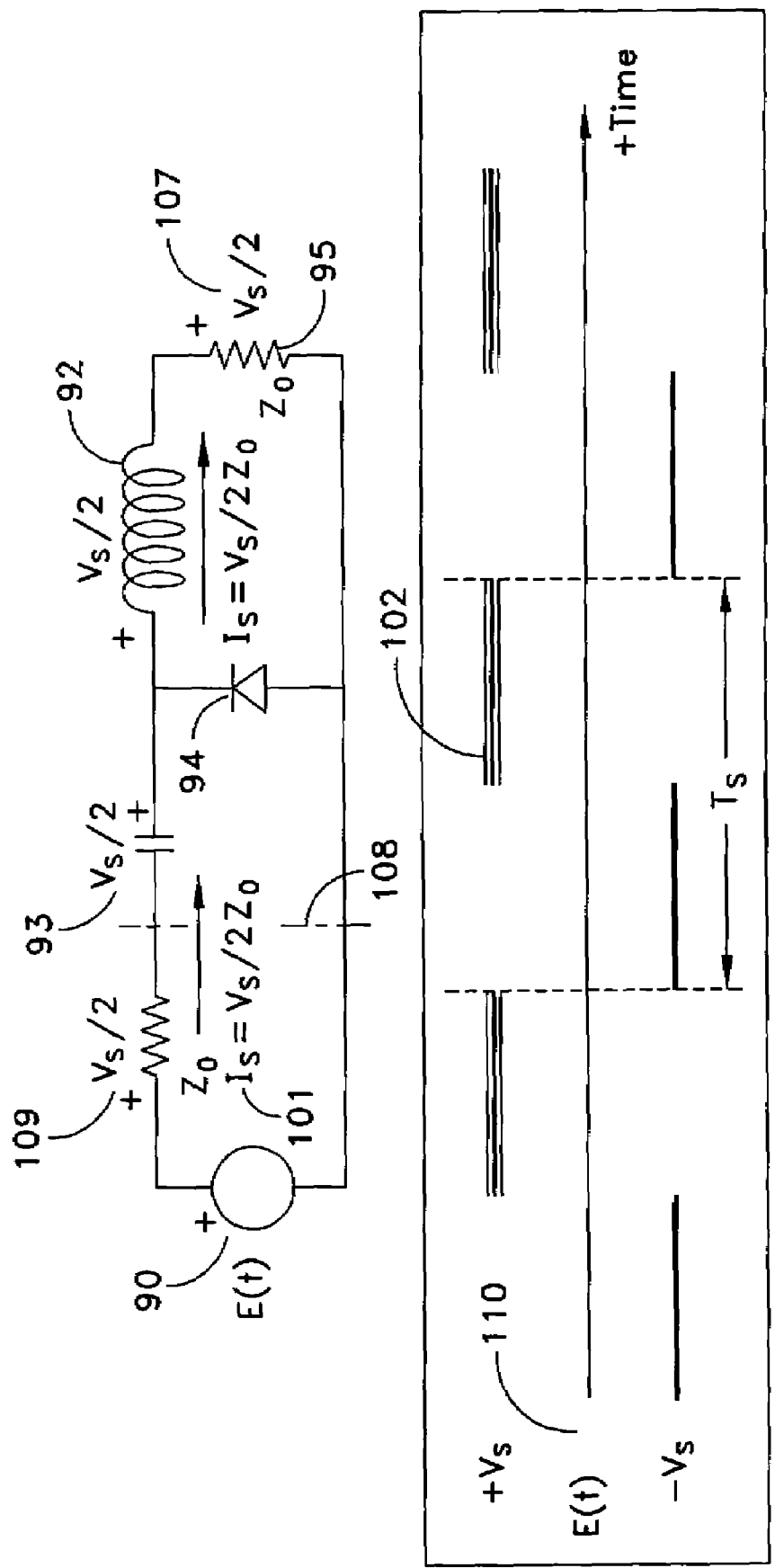
FIG. 10 depicts a [square-wave]-to-DC converter, POSITIVE half period.

A converter circuit steady-state operation during the POSITIVE half period is illustrated in FIG. 10. In the figure, the current through a branch with the diode 94 is zero. Thus, a current 101 driven by the generator 90 flows through the inductor 92, the capacitor 93 and the load resistor 95. During this half period, energy is delivered to the circuit by the capacitor 93 while the stored energy of the inductor 92 is increasing. The average, steady-state, energy stored on the 93 is $E_{AVG}=C(V_S)^2/8$ in which "C" is the capacitance of the capacitor. The energy delivered to the circuit by the capacitor during each POSITIVE half period is $E_{DEL}=T_S(V_S)^2/8Z_0$. The choice of value of the capacitor 93 is made by observing that the delivered energy, $E_{DEL}$, should be a fraction of the average energy, $E_{AVG}$. This will be true if the capacitance is much greater than the ratio $T_S/Z_0$. Thus, $C>>T_S/Z_0$ is required. During the POSITIVE half periods of the square-wave, the voltage across the branch of the diode 94 is $V_S$ with a polarity that reverse-biases the diode junction so that no current can flow in the branch.

During this half period, the square-wave source 90 (generator) presents a positive voltage, $V_S$, to the circuit causing a current $V_S/2Z_0$ to flow in the circuit. The diode 94 is reverse-biased by a voltage equal to $V_S$ so that no current flows in the branch containing the diode. Thus, the current, $I_S$, flows through the load, $Z_0$, generating a voltage $V_S/2$ across the load. During this half period, the capacitor 93 supplies energy to the circuit while the inductor 92 is storing energy.

Figure 11:
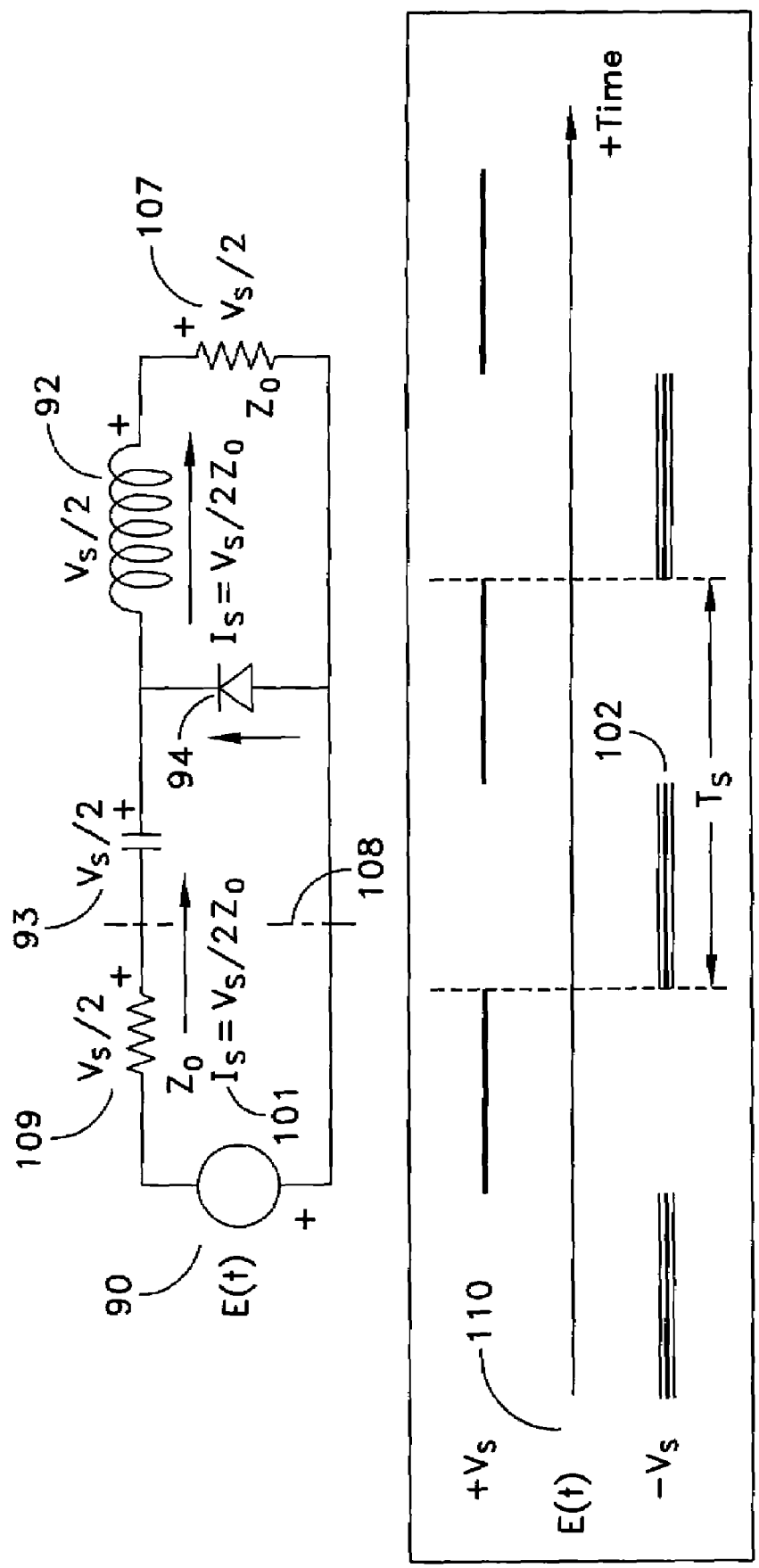
FIG. 11 depicts a [square-wave]-to-DC converter, NEGATIVE half period.

The steady-state operation of the converter circuit during a polarity change 102 of a NEGATIVE half period is illustrated in FIG. 11. In the figure, the voltage across a branch of the diode 94 is zero and the current through the branch is $V_S/Z_0$, which is twice the current 101 driven by the square-wave source 90. During this half period, $T_S/2$, energy is delivered to the circuit by the inductor 92 while the stored energy of the capacitor 93 is increasing. The average, steady-state, energy stored on the inductor 92 is $E_{AVG} = \{L(V_S)^2\}/8(Z_0)^2$ in which "L" is the inductance of the inductor. The energy delivered to the circuit by the inductor 92 during each NEGATIVE half period is $E_{DEL} = T_S(V_S)^2/8Z_0$. The choice of value of the inductor 92 is made by observing that the delivered energy, $E_{DEL}$, should be a fraction of the average energy, $E_{AVG}$. This will be true if the inductance is much greater than the product, $Z_0 T_S$. Thus, $L \gg Z_0 T_S$ is required.

During this half period, the square-wave source 90 presents a negative voltage, $-V_S$, to the circuit causing a current, $-V_S/2Z_0$, to flow in the circuit. The diode 94 is forward-biased by a current equal to $V_S/Z_0$ and the voltage containing the diode is about zero. A current, $I_S$, flows through the load, $Z_0$, generating a voltage, $V_S/2$, across the load. During this half period, the capacitor 93 is storing energy while the inductor 92 supplies energy to the circuit.

Energy balance is achieved if the ratio of the element values, L and C, are chosen such that $(L/C) = (Z_0)^2$. Then, the average energy stored on each element is the same. The energy exchange during each period of steady-state operation is illustrated in FIG. 12.

Figure 12:
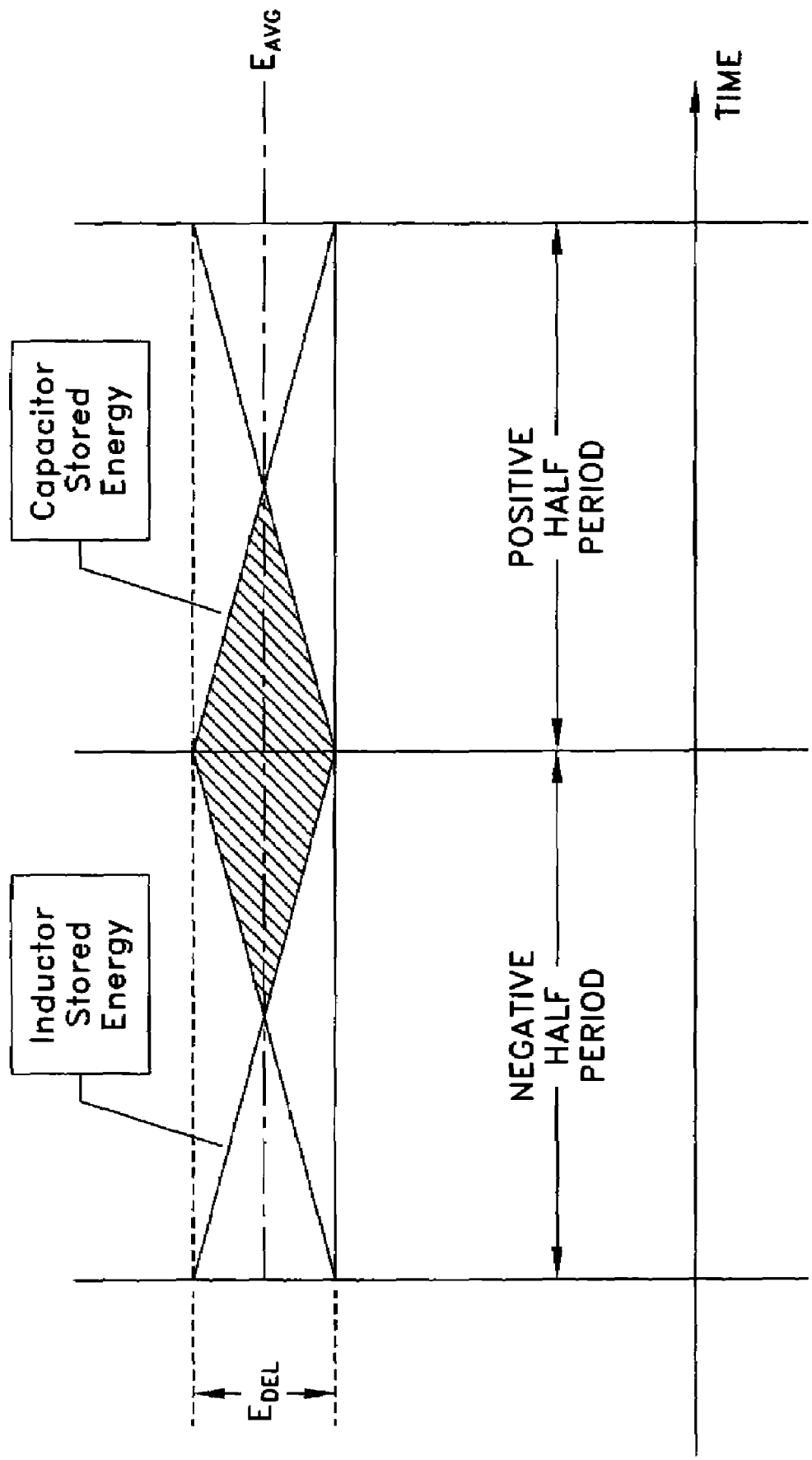
FIG. 12 depicts a DC converter, steady-state energy exchange.

FIG. 12 depicts the time variation of the energy stored on the inductor and capacitor components in the DC converter illustrated in FIG. 9, FIG. 10 and FIG. 11. During each half period, energy is delivered to the circuit by either the inductor or the capacitor while the energy stored on the other component is increasing. During the next half period, the process reverses. FIG. 12 is based on a condition that $E_{DEL} \ll E_{AVG}$. Only one period is illustrated because, in the steady-state condition, each period is identical to every other period.

By comparing FIG. 10 with FIG. 11, the effects caused by the instantaneous change in square-wave polarity from POSITIVE to NEGATIVE are seen. The instant that the square-wave polarity changes, the voltage across the inductor 92 also changes polarity, but not magnitude, while the current through the capacitor 93 changes direction, but not magnitude. Both of these instantaneous changes are permissible by the boundary conditions imposed by the circuit components and no transient behavior occurs as a result of the polarity change. The current through the inductor 92 and the voltage across the capacitor 93 do not change when the square-wave polarity changes and this is also required by their respective boundary conditions. The current through a load 107 is the same as the current through the inductor 92 and does not change in either polarity or magnitude. Thus, as predicted, the load 107 experiences direct current (DC).

By comparing FIG. 10 with FIG. 3 and FIG. 11 with FIG. 4, the converter circuit is indistinguishable from a resistive termination, $Z_0$. Consider a boundary 108 shown in FIG. 10 and a boundary 27 shown in FIG. 3.

The generator 90 and a Thevenin-Equivalent circuit 109 to the left of the boundary 108 in FIG. 10 is identical to the generator 10 and a Thevenin-Equivalent circuit 28 to the left of the boundary 27 in FIG. 3.

The current 101 crossing the boundary 108, from the generator 90 to the converter circuit is identical to the current 16 crossing the boundary 27 from the generator 10 to the matched termination, $Z_0$ in FIG. 3.

The voltage across the boundary 108 is $V_S/2$, which is identical to the voltage across the boundary 27.

Thus, during the POSITIVE half cycle of a square-wave, the converter circuit is indistinguishable from a resistor having a value $Z_0$.

Consider the boundary 108 shown in FIG. 11 and the boundary 27 shown in FIG. 4.

The generator 90 and the Thevenin-Equivalent circuit 109 to the left of the boundary 108 in FIG. 11 is identical to the generator 10 and a Thevenin-Equivalent circuit 28 to the left of the boundary 27 in FIG. 4.

The current 101 crossing the boundary 108, from the converter circuit to the Thevenin-Equivalent generator is identical to the current 22 crossing the boundary 27 from the matched termination, $Z_0$, of FIG. 4, to the Thevenin-Equivalent generator.

The voltage across the boundary 108 is $-V_S/2$, which is identical to the voltage across the boundary 27.

Thus, during a NEGATIVE half cycle of a square-wave 110, 45, the converter circuit is indistinguishable from a resistor having a value, $Z_0$.

An important property of the converter circuit is demonstrated in that after reaching a steady-state condition, the disclosed converter circuit is indistinguishable from a resistive termination, $Z_0$, when driven by a square-wave. This property allows the converter circuit to be used as a matched termination for a uniform transmission line of any length with a transmission line characteristic impedance equal to $Z_0$ when the uniform transmission line is driven by a square-wave source. This property is illustrated in FIG. 13.

Figure 13:
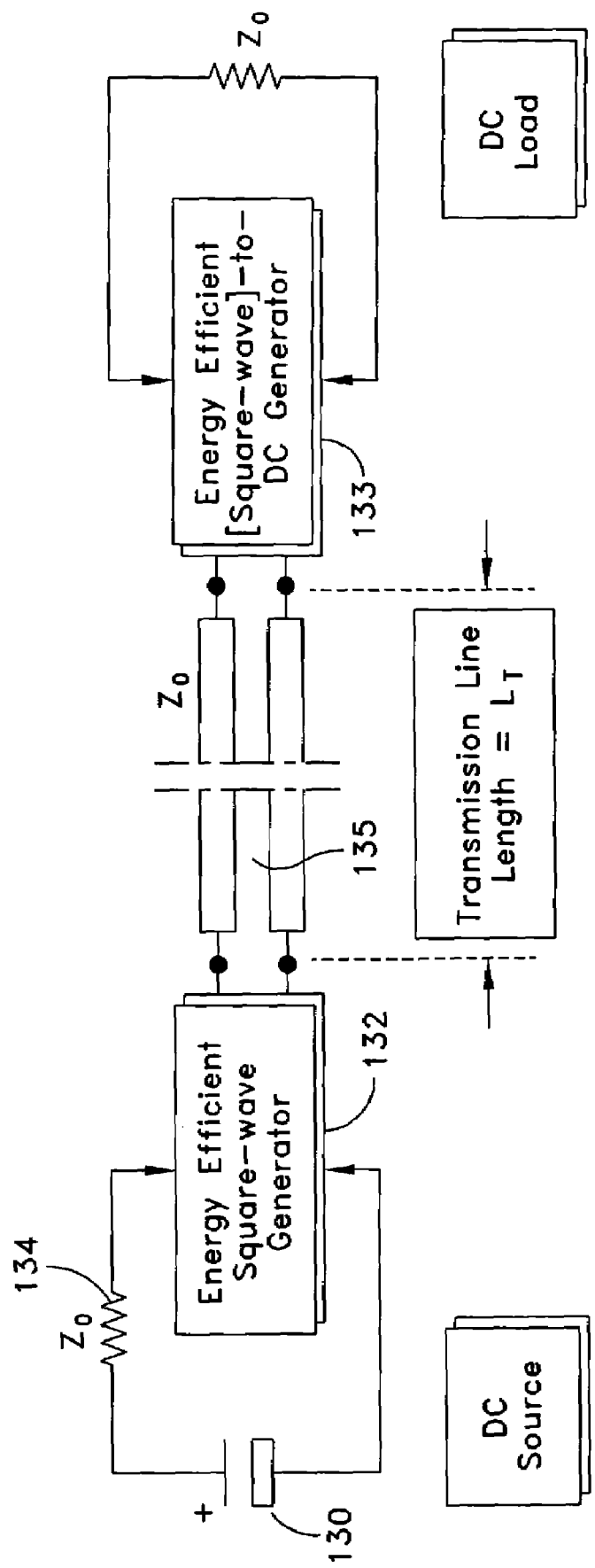
FIG. 13 depicts a power transmission model.

In FIG. 13, power from a DC source 130 is transmitted over a distance, $L_T$, by using an energy efficient square-wave generator 132 and an energy efficient [square-wave]-to-DC converter 133. The source impedance 134 of a generator, the characteristic impedance of a transmission line 135 and the DC load impedance are each equal to $Z_0$. The transmission line 135 can be comparatively long since the converter 133 presents a matched termination to the transmission line. The matched termination insures that there are no reflections or standing waves on the line that would corrupt the operation of the system.

Figure 14:
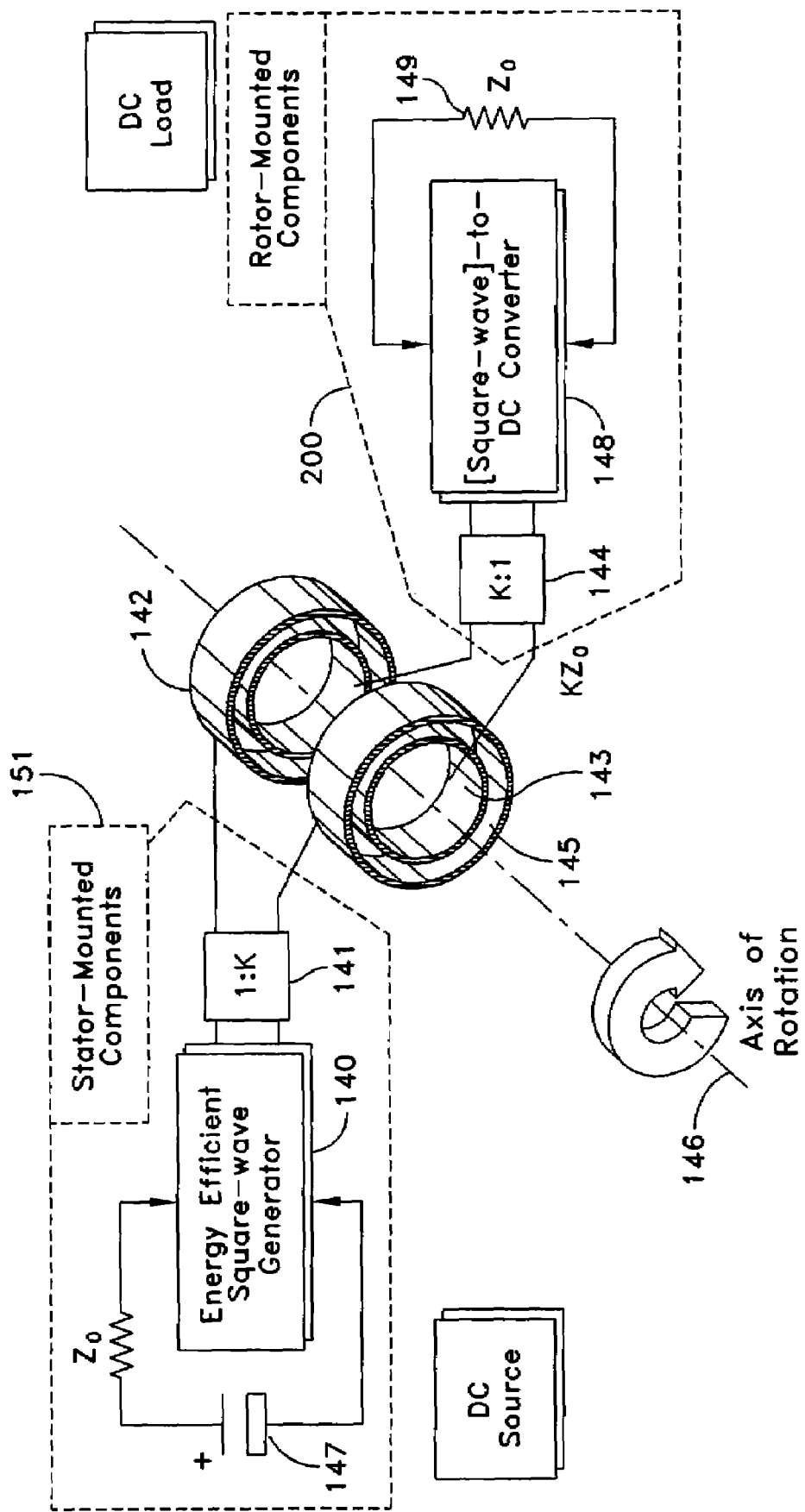
FIG. 14 depicts coupling DC power to electrical circuits on a rotating structure using a frictionless coupler.

A Method for Efficiently Coupling a DC Power Source Across a Nearly Frictionless High Speed Rotation Boundary In FIG. 14, an energy-efficient square-wave generator 140 is schematically shown in which the generator is connected through a transformer 141 to stator rings 142 of a nearly frictionless capacitor coupling with rotor rings 143 which are capable of operating at high speeds of rotation. The rings 142 and 143 form nearly frictionless capacitor couplings. The transformers 141, 144 of the transmission line step up the impedance level at the capacitor couplings to increase the time constant of the capacitor circuit. The wideband transformers 141 and 144 raise the impedance level at the dielectric boundary by a factor of K in order to increase the transmission efficiency across the rotation boundary.

Wideband transmission-line transformers and baluns are extensively used in circuit applications covering a few MHz to a few GHz. Multiple designs have been described in literature covering transformation ratios up to approximately 64:1. In general, any impedance ratio of the form $(M^2/N^2)$, in which M and N are integers, can be realized using the wideband transmission-line concepts.

In principal, the impedance level, $KZ_0$, can be comparatively large. However, practical circuit limitations will usually constrain $KZ_0$ to a maximum of approximately 600 Ohms. Assuming that the coupling capacitance between the concentric rotor ring 143 and the stator ring 145 is 10 pico-Farad (pF), the period $T_S$ of the square-wave generator 140 will be constrained by $T_S<2RC$, or $T_S<2[(600)\times(10^{-11})]$, or $T_S<12$ nano-seconds. Thus, the frequency of the square-wave would be about 50 MHz, which is well within the practical limitations of the disclosed method. A coupling capacitance of approximately 10 pF would correspond to a concentric cylinder mean diameter of two centimeters (cm), a cylindrical height of two cm, and a separation between the concentric cylinders of one millimeter. The calculation assumes that the medium separating the concentric cylinders has a relative dielectric constant of unity, which would correspond to dry air or a vacuum.

In the embodiment illustrated in FIG. 14, the generator 140 converts a DC source 147 with internal impedance $Z_0$, to a zero average value square-wave source at the impedance level, $Z_0$. The output of the generator 140 drives the wideband transmission-line transformer 141 that raises the impedance level of the square-wave source to $KZ_0$. The output of the transmission line of the transformer 141 is connected to the stator rings 142 and 145 of a rotary coupling mechanism comprising the capacitance between the concentric rings 143. The rotating inner rings 143 form the output circuit of the coupling mechanism. For the purposes of illustration, the inner rings 143 are assumed to rotate while the outer stator rings 142 and 145 remain stationary. In practice, either ring 142 or 145 could operate like the rotating ring 143 without affecting the operation of the disclosed method. In some instances, all of the rings may rotate simultaneously.

The inner rotor rings 143 are connected to the transmission line transformer 144 that reduces the impedance level of the square-wave to $Z_0$. The output of the second transmission line transformer 144 feeds a converter 148 that converts the square-wave to a direct current, which feeds a load resistor, $Z_0$ (149). In this embodiment, the load at the load resistor 149, the converter 148, and the transformer 144 are assumed to be mounted on a rotor-mounted component 200, which may, for example, be the wheel of a vehicle, the rotating field of an electromechanical device, the propeller of a boat, or other free-to-rotate structure. Stator mounted components include the step-up transformer 141, the square-wave generator 140, and the DC source 147.

The practical usefulness of the disclosed method can be related to the power that can be delivered to the rotating platform; however, there is a limitation on the amount of power that can be delivered to a load using the disclosed method. The limitation is fixed by the non-linear properties of the diode used in the converter circuit. The maximum current that can be delivered to a load is one-half of the maximum forward current that the diode can safely carry. The maximum voltage that can be delivered to a load is one-half of the breakdown voltage of the diode. The maximum DC power that can be delivered to a load is the product of one-half of the forward current and one-half of the breakdown voltage. For example, a diode with a reverse breakdown voltage of 100 Volts may be able to support a maximum forward current of one ampere. Then, the maximum power that could be delivered to a resistive load by a converter that uses this diode would be 25 Watts (50 Volts×500 mA).

Furthermore, the switching speed of the converter diode is limited by a junction capacitance of the converter diode, which also determines the current handling capacity of the junction. The switching speed should be less than ten percent of the square-wave period, $T_S$. Thus, as the coupling capacitance of the concentric-cylinder coupling mechanism is increased, the square-wave period can be proportionately increased. Then, because the required diode switching speed can be increased, the converter diode junction area can be proportionately increased, which results in a proportionately higher current-handling capability and proportionately higher power can be delivered to the load. In principal, the disclosed method is scalable to the large power levels that would be needed to power air compressors on the wheels of a moving vehicle.

It will be understood that many additional changes in details, materials, steps and arrangement of parts which have been described herein and illustrated in order to explain the nature of the invention, may be made by those skilled in the art within the principle and scope of the invention as expressed in the appended claims. Further, those skilled in the art will recognize that a dual coupling mechanism using magnetically coupled coils is an obvious extension of the disclosed method and is implicitly included in the principle and scope of the invention.

What is claimed is:

1. A method for coupling direct current from a direct current power source across a rotatable boundary, said method comprising the steps of:

providing the direct current power source with internal impedance equal to $Z_0$;

providing, in series with the power source, a switching circuit containing a periodically time varying switch that is capable of converting voltage of the power source into a square-wave voltage across a load resistance equal to $Z_0$;

providing, in series with the switching circuit, a first transmission line with characteristic impedance equal to $Z_0$;

providing a first transformer with turns ratio 1:K and with the 1-turns winding electrically connected to the output of the first transmission line;

providing a set of capacitive couplings, each of which has at least one stator ring and one rotor ring in relative proximity such that each pair comprising one stator ring and one rotor ring form a coupling capacitor and such that the rotor rings are capable of rotating free while a coupling capacitance remains essentially constant;

interposing a dielectric medium between each stator ring and each rotor ring;

providing an electrical connection between two terminals of the K-turns winding of the first transformer and the stator rings of the set of coupling capacitors;

providing a second transformer with turns ratio K:1;

providing an electrical connection between the rotor rings and two terminals of the K-turns winding of the second transformer such that the set of coupling capacitors form a series electrical connection between the K-turns winding of the first transformer and the K-turns winding of the second transformer;

providing a second transmission line with characteristic impedance, $Z_0$;

providing a series electrical connection between the 1-turns winding of the second transformer and input terminals of the second transmission line;

providing a non-linear circuit containing at least one diode, such non-linear circuit being series connected between output terminals of the second transmission line and the load with impedance $Z_0$ such that the non-linear circuit is designed to convert the square-wave voltage and a current into the direct current through the load with impedance $Z_0$;

generating the square-wave of voltage and current by periodic operation of the switch;

achieving a steady-state condition of the square-wave within the first transmission line by said generating step;

changing the impedance level of a square-wave frequency with the first transformer by a factor to be determined by the coupling capacitance;

outputting the square-wave from the first transformer to the set of stator rings;

transmitting the square-wave from the set of stator rings through the dielectric medium to the set of rotor rings;

transmitting the square-wave from the rotor rings to the second transformer;

changing the impedance level of the square-wave with the second transformer; and converting the square-wave into a direct current source such that the direct current is coupled across the rotatable boundary and delivered to the load.

2. The method in accordance with claim 1 wherein the dielectric medium is a vacuum.

3. The method in accordance with claim 1 wherein the dielectric medium is a gas.

4. The method in accordance with claim 1 wherein the dielectric medium is a liquid.

5. The method in accordance with claim 1 wherein the rotatable boundary is the set of rotor rings.

6. The method in accordance with claim 5 wherein the dielectric medium is a vacuum.

7. The method in accordance with claim 5 wherein the dielectric medium is a gas.

8. The method in accordance with claim 5 wherein the dielectric medium is a liquid.

9. The method in accordance with claim 1 wherein the rotatable boundary is the set of stator rings.

10. The method in accordance with claim 9 wherein the dielectric medium is a vacuum.

11. The method in accordance with claim 9 wherein the dielectric medium is a gas.

12. The method in accordance with claim 9 wherein the dielectric medium is a liquid.

13. The method in accordance with claim 5 wherein the set of stator rings is a rotatable boundary.

14. The method in accordance with claim 13 wherein the dielectric medium is a vacuum.

15. The method in accordance with claim 13 wherein the dielectric medium is a gas.

16. The method in accordance with claim 13 wherein the dielectric medium is a liquid.

17. A system for coupling a stationary and a rotatable component to each other with power from a direct current source, said system comprising:

a first transmission line;

a generator electrically connected in series in said first transmission line to the direct current source with said generator including a controlling switch, said generator capable of converting said direct current source with an internal impedance to a zero average value square-wave source at the impedance level;

a first transformer electrically connected to said generator in the transmission line;

a set of capacitor couplings including a set of rotor rings, each rotor ring of said set of rotor rings capable of a high speed of rotation and a set of stator rings, each stator ring of said set of stator rings concentric and encompassing each rotor ring of said rotor rings to form a capacitor coupling of said set of capacitor couplings;

a dielectric medium interposed between each stator ring and each rotor ring;

a second transmission line;

a second transformer electrically in series with said rotor rings in said second transmission line;

a converter electrically connected with said second transformer, said converter capable of converting the square-wave to a direct current;

wherein said first transformer is capable of stepping up an impedance level to the capacitor couplings to increase the transmission efficiency across said rotation boundary;

wherein said rotor rings as rotatable inner rings form an output circuit of the coupling mechanism to said second transmission line;

wherein said second transformer is capable of stepping down an impedance level of the square-wave from the capacitor couplings; and wherein said converter terminates at an impedance level matching the termination of said generator such that said converter converts the square-wave to a direct current power source for use across said dielectric medium.

18. The system of claim 17 said system further comprising a load resistor electrically connected to said converter, said load resister capable of receiving the direct current from the converter.

19. The system of claim 18 wherein said stator rings and rotor rings are capable of rotating in relation to each other.

20. The system of claim 19 in which the switching speed of said generator is less than ten percent of the square-wave frequency period.

* * * * *